United States Patent [19]

Sangster

[11] Patent Number: 4,606,893
[45] Date of Patent: Aug. 19, 1986

[54] SWIMMING POOL CHEMICAL DISPENSER

[75] Inventor: Arlon G. Sangster, Sterling, Mass.

[73] Assignee: Olin Corporation, Cheshire, Conn.

[21] Appl. No.: 680,625

[22] Filed: Dec. 11, 1984

[51] Int. Cl.[4] .................................................. B01D 11/00
[52] U.S. Cl. .................................. 422/265; 222/23;
220/253; 210/169; 210/198.1; 116/200; 4/227;
4/228; 422/37
[58] Field of Search ........................ 422/37, 265, 261;
4/222, 223, 228, 227; 220/253; 222/51, 190,
463, 23, 548, 559, 153; 210/169, 198.1; 116/228,
200, 26, DIG. 7; 73/307

[56] References Cited

U.S. PATENT DOCUMENTS

| | | | |
|---|---|---|---|
| D. 269,801 | 7/1983 | Sangster et al. | D23/3 |
| D. 269,802 | 7/1983 | Alexander et al. | D23/3 |
| D. 273,033 | 3/1984 | Sangster et al. | D23/3 |
| 2,934,409 | 4/1960 | Biehl | 210/198.1 X |
| 3,194,455 | 7/1965 | Castelli | 222/548 X |
| 3,781,926 | 1/1974 | Levey | 4/228 |
| 3,792,979 | 2/1974 | Clinton | 422/265 |
| 3,845,874 | 11/1974 | Robbins et al. | 215/214 |
| 3,848,761 | 11/1974 | Libit | 215/220 |
| 3,896,958 | 7/1975 | Robbins et al. | 215/211 |
| 3,989,152 | 11/1976 | Julian | 215/216 |
| 4,105,132 | 8/1978 | Keeler | 215/216 |
| 4,241,025 | 12/1980 | Grayson, IV et al. | 422/265 X |
| 4,371,088 | 2/1983 | Gach | 215/220 |
| 4,473,533 | 9/1984 | Davey | 422/265 |
| 4,514,866 | 5/1985 | Pong | 4/228 |
| 4,534,070 | 8/1985 | Hauptmann et al. | 4/222 X |

*Primary Examiner*—Joseph J. Rolla
*Assistant Examiner*—Edward S. Ammeen
*Attorney, Agent, or Firm*—Ralph D'Alessandro; Thomas P. O'Day

[57] ABSTRACT

A dispenser for soluble pool chemicals is provided having a child-resistant rotatably openable top utilizing an angled detent and a deformable stop to resist rotation until a threshold amount of rotative force is applied, the top being adjustably openable to control the amount of pool chemicals dispensed via dispensing openings in a ballast disk that is fixed in place by the interlocking of interlocking recesses with locking tabs on the neck of the dispenser container to permit the top with its dispensing openings to rotate relative to the disk to uncover the dispensing openings in the disk to the desired amount.

8 Claims, 9 Drawing Figures

SWIMMING POOL CHEMICAL DISPENSER

BACKGROUND OF THE INVENTION

This invention relates generally to sanitizing swimming pools and, more specifically, is directed to a dispenser for dispensing swimming pool chemical into the surrounding water while the dispenser is immersed in the water.

Sanitizing agents and bacteria-killing agents that are water soluble must be added regularly to swimming pool water to kill bacteria and inhibit growth of organic matter so that a safe and comfortable swimming environment can be maintained. Chlorine, or compounds of chlorine, typically are used for this purpose.

Pool chemicals can be added to swimming pools either through in-line flow circuits, through broadcast distribution of granular product or concentrated dosages of liquid product. Whatever the form of administering the pool chemical, pool water should be maintained at a desired chlorine concentration ranging anywhere from about 0.1 to about 25.0 parts per million by weight residual chlorine. A preferable range is from about 0.3 to about 5.0 parts per million by weight. Maintaining this desired range, however, is difficult because the chlorine concentration in the water is affected by a multitude of factors, such as pool water temperature, the amount of sun light, rain, the number of bathers, the size of the pool and other factors.

Calcium hypochlorite compositions are a well-known source of available chlorine for disinfecting and sanitizing water supplies, especially swimming pool water. Calcium hypochlorite is a highly soluble basic material that dissolves rapidly in water in comparison to the other compounds which are sources of available chlorine, such as trichloroisocyanurates that dissolve much more slowly without leaving insoluble residues.

Trichloroisocyanurates are normally utilized in tablet form and are typically added to a pool in a skimmer, which is in the in-line flow circuit of water from the pool, or by using a floating feeder device. These tablets normally dissolve slowly over a 1 or 2 week period, giving continuous protection to the pool with minimal effort by the pool owner.

In contrast, however, calcium hypochlorite dissolves very quickly and leaves a small amount of insoluble residue. The residue will remain in the bottom of pool chemical feeders that are employed in skimmer or which will precipitate to the bottom of the pool if the chemical is delivered by broadcast spreading. However, because of the quick dissolution rate calcium hypochlorite application requires daily attention by the maintainer of the pool if even chlorination levels are to be maintained.

Alternately, periodic treatments with large doses of calcium hypochlorite are employed. This is less desirable since it results temporarily in a higher than normal chlorine concentration in the pool water which is a shock treatment, spiking the chlorine concentration in the swimming pool water. Periodic treatments can also be administered through a skimmer.

Even where containers for calcium hypochlorite have been used to dispense the chemical into pool water, adjustability of the container or dispenser to selectively control the feed rate of the chemical in response to changing demand has been a limiting feature. There also has been no true or simple indicator of when the pool chemical container or feeder is empty. The use of containers to dispense pool chemicals also requires some type of tamper-resistant opening mechanism to prevent unintentional or undesired openings from occuring.

Additionally, the broadcast method of treating pools with granular calcium hypochlorite and the placing of calcium hypochlorite briquettes in a skimmer require the maintainer of the pool to handle the chemical.

Thus, the use of calcium hypochlorite as a pool sanitizer can potentially be inconvenient because of the fast dissolution rate and the frequent attention required on the part of the owner.

These problems are solved in the design of the present invention wherein a pool chemical dispensing capsule is formed of a material which holds the pool chemical and which has a selectively adjustable top to permit selective relative rotational movement between the top and the container to allow the dissolved pool chemical to be dispensed at a selectively controlled rate.

SUMMARY OF THE INVENTION

It is an object of the present invention to provide a pool chemical dispenser which automatically signals when it is empty and a new unit is required.

It is another object of the present invention to provide a pool chemical dispenser that leaves no residue in the bottom of the dispenser.

It is a further object of the invention to provide a pool chemical dispenser that may be adjusted to selectively control the rate at which the pool chemical is dispensed from the dispenser.

It is still another object of the present invention to provide a pool chemical dispenser that resists unintentional or undesired initial opening until the dispenser is ready for use in a pool.

It is a feature of the present invention that the dispenser inverts when the capsule or container portion holding the chemical is substantially empty.

It is another feature of the present invention that a ballast disk is employed in the dispenser which has a specific gravity greater than about 1.0 to make the dispenser top heavy when immersed in water to facilitate the dispenser's inversion after substantially all of the pool chemical has been dispensed.

It is another feature of the present invention that the dispenser may be utilized within a skimmer.

It is still another feature of the present invention that the container portion of the dispenser is made of a material with a specific gravity that is less than about 1.0.

It is yet another feature of the present invention that the combined specific gravity of the entire dispenser is less than about 1.0.

It is a further feature of the present invention that the dispenser holds the bulk of the pool chemical within its container portion while the circulating pump for the pool is not operating, thereby preventing the rapid buildup of pool chemical in the static water of the pump and minimizing the potential for chemical attack of expensive pool equipment.

It is an advantage of the present invention that the dispenser clearly indicates when it is empty by rising and inverting so that the bottom of the dispenser is visible floating on the surface of the water.

It is another advantage of the present invention that any residue of pool chemical is emptied out of the container into the skimmer so none remains after the container has inverted.

It is yet another advantage of the present invention that the dissolving rate of the pool chemical can be controlled in response to the pool size and chlorine demand because of the adjustability of the top.

It is a further advantage that the pool chemical does not have to be handled by the maintainer of the pool.

It is still another advantage that the dispenser of the present invention is convenient and effective, especially when used with calcium hypochlorite, to reduce the attention that must be given to maintaining the quality of the pool water.

These and other objects, features and advantages are obtained by providing a pool chemical dispenser with an adjustable rotatable top with a plurality of detents fixed between inner and outer lips, a container for holding pool chemical with an open-topped neck portion having radial rotation stops and a deformable stop, and a ballast disk cooperable with the adjustable top so that the dissolution rate of the pool chemical may be selectively controlled by the rotation of the adjustable top with respect to the container and the interaction of the detents with the deformable stop and the radial rotation stops.

BRIEF DESCRIPTION OF THE DRAWINGS

The advantages of this invention will become apparent upon consideration of the following detailed disclosure of the invention, especially when it is taken in conjunction with the accompanying drawings wherein.

DETAILED DESCRIPTION OF THE PREFERRED EMBODIMENT

Figure 1:
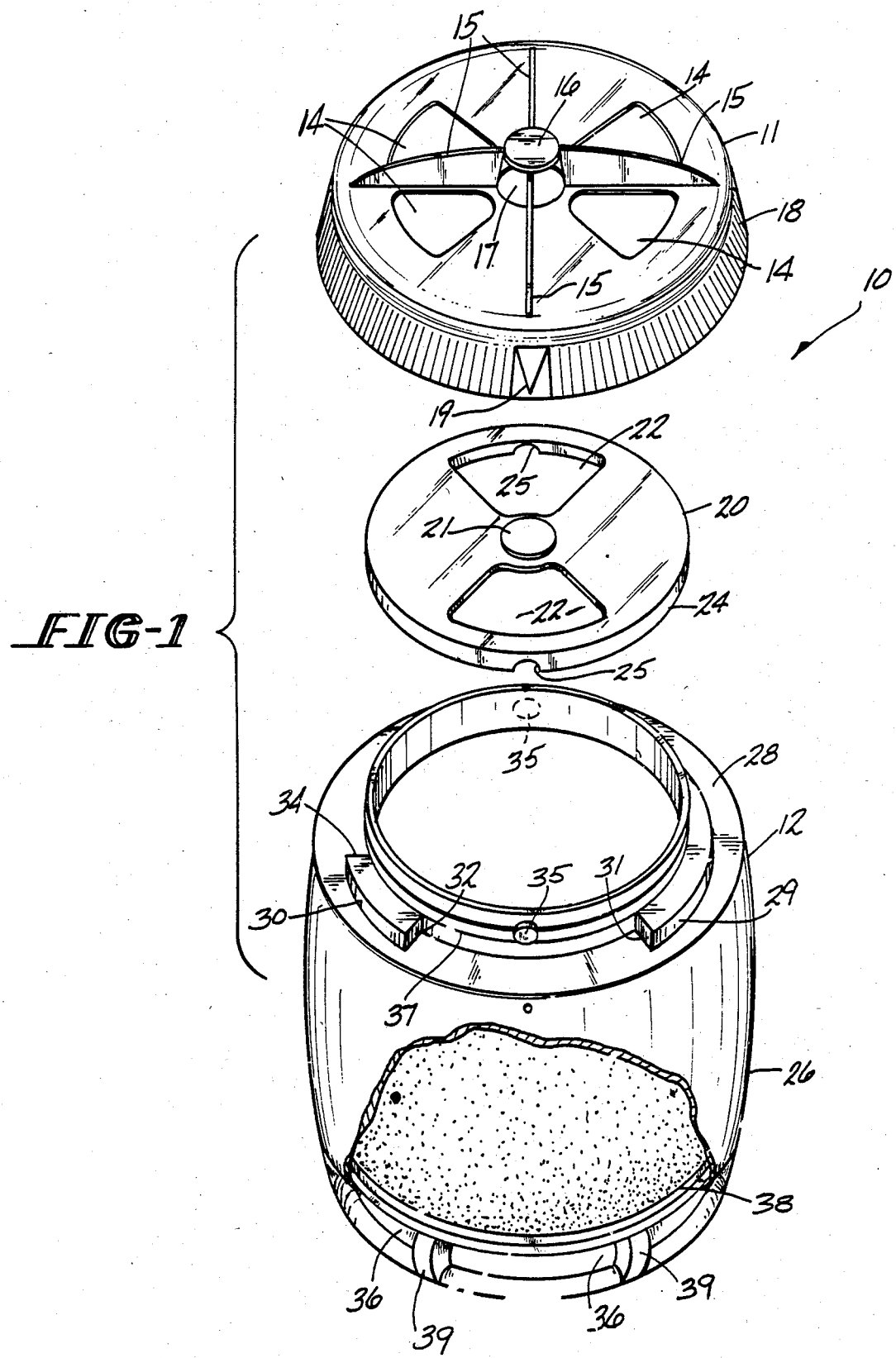
FIG. 1 is a front perspective view of the pool chemical dispenser in an exploded configuration with a portion of the sidewall broken away.

FIG. 1 shows in exploded form a front perspective view of the dispenser, indicated generally by the numeral 10. Dispenser 10 is seen comprising an adjustable top 11 that is rotatably mounted atop the bottom capsule or container 12. A ballast means or disk 20 is inserted within the adjustable top 11.

Figure 2:
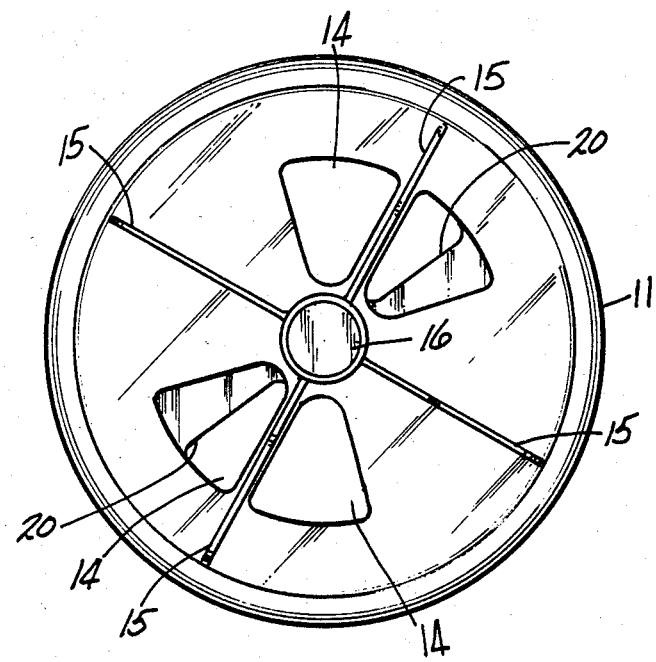
FIG. 2 is a top planar view of the adjustable top of the pool chemical dispenser showing the container with the dispensing openings partially open.
Figure 3:
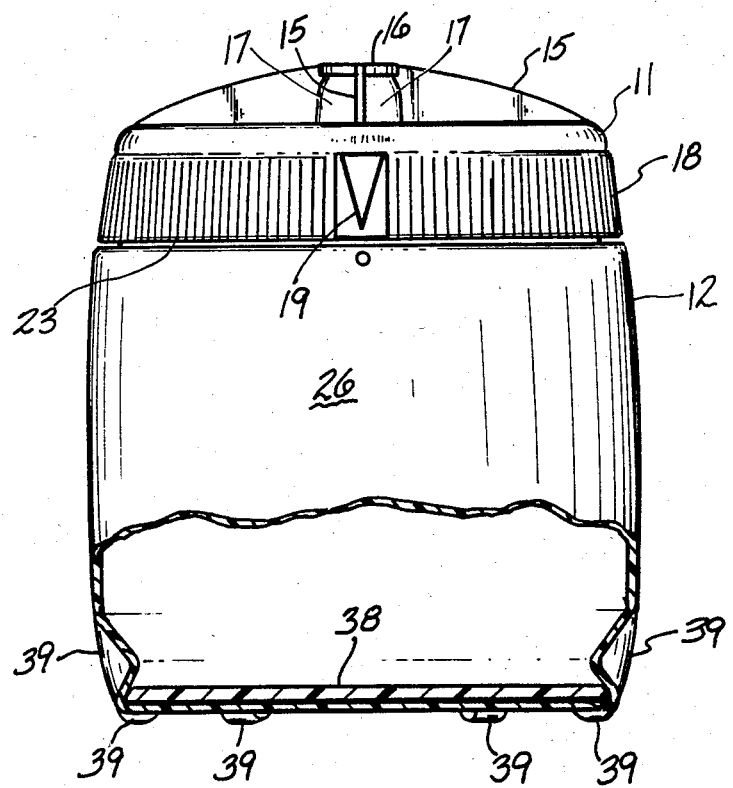
FIG. 3 is a side elevational view of the pool chemical dispenser with a portion of the side wall broken away.

The adjustable top 11, seen in FIGS. 1-3, has dispensing apertures or openings 14 in the top surface. Grip ridges 15 cut the generally circumferentially shaped top 11 into quadrants and separate the dispensing openings 14. The grip ridges are tapered from a height where they connect with the circular connector top 16 downwardly into the edges of the top 11 at their outermost limit furthest away from the center of the top. A flow passage 17 exists between each adjacent pair of grip ridges 15 to permit water to flow freely across the openings 14 on opposite sides of the grip ridges 15. The top 11 has a downwardly sloped lip 18 that extends about its entire circumferential periphery. The lip 18 can have an opening indicator 19, such as an arrow which may be used to gauge the size of the openings selected in the top 11 to provide a selectively controlled rate for the dispensing of the pool chemical contained within the bottom container 12. Lip 18 may also have serrations or ridges 23 about a substantial portion of the circumferential periphery to facilitate gripping and rotating the top 11.

Ballast disk 20, as seen in FIG. 1 has on its upper surface a raised circular portion 21 that snaps within a mating circular section beneath the circular connector top 16 and the flow passages 17 of adjustable top 11. This feature facilitates manufacturing preassembly of the top 11 and the ballast disk 20. Disk 20 has dispensing apertures 22 in the top surface to permit the pool chemical to exit the dispenser 10 with the water after it is dissolved in the bottom container 12. A circumferential disk lip 24 terminates the generally round ballast disk 20. Disk lip 24 is sized appropriately such that it fits just within the inner lip 48 of adjustable top 11, best seen in FIG. 8, and over the top of the neck portion 27 of the open-topped container. Disk lip 24 has disk locking recesses 25 on diametrically opposing sides.

Bottom capsule or container 12 is seen in FIG. 1 as being open-topped with a neck portion 27 that has a smaller diameter than the remainder of the generally cylindrically shaped or slightly tapered container 12. A shelf or ledge 28 connects the neck portion 27 to the side wall 26. The bottom portion of the container 12 has recessed portions 36 between capsule ribs 39, best seen in FIGS. 1 and 3. The bottom recess portions 36 facilitate grasping the dispenser 10 after it has inverted itself in the water, having emptied all of the pool chemical and residue into the skimmer in which it is placed.

The neck 27 of container 12 is seen in FIG. 1 to have a large top radial rotation stop 29 and a small top radial rotation stop 30. The large top radial rotation stop 29 has a rotation stop surface 31 on one end and a tapered ramp 33, see briefly FIG. 9, that slopes back into the neck 27 on the opposing end. The top radial rotation stop 30 has two generally straight stop surfaces 32 and 34. Circular locking tabs 35 extend from diametrically opposing sides of container neck 27. A locking lip 37 extends outwardly and slightly downwardly from container neck 27 to cooperate with retaining thread 51 of the adjustable top 11, seen in FIG. 8, to hold the adjustable top rotatably in place on top of the dispenser.

If desired, additional flotation means, such as a foam disk 38, seen in FIGS. 1 and 3, may be employed to make the dispenser 10 more buoyant to help it rise off the bottom of the skimmer 41 more readily, as diagrammatically illustrated in FIGS. 4-7. The disk 38 hastens the ability of the dispenser 10 to rise off the bottom and invert itself. However, because the adjustable top 11 and bottom container 12 are made of a material, preferably molded, that has a specific gravity less than 1.0, the dispenser 10 will naturally rise off the bottom as the pool chemical is substantially dissolved within the container 12. This has been found to occur approximately at about 90 to about 99% dissolution of the pool chemical within the container 12. A preferred material for use in molding has been polyethylene which has a specific gravity of about 0.95. However, any easily workable material may be employed as long as the combined or total specific gravity is less than that of water. Since the pool chemical placed within the container 12 has a specific gravity greater than 1.0, the low specific gravity of the dispenser 10 permits it to rise off the bottom after substantially all of the heavier pool chemical is dissolved.

The ballast disk 20 is molded from material with a specific gravity greater than 1.0, such as a high density filled polyethylene, polypropylene or acrylic. The acrylic has a specific gravity of about 1.7 and filled polypropylene about 1.25. Having a ballast disk 20 with a specific gravity greater than 1.0 makes the dispenser 11 top heavy when immersed in water and causes it to invert as the dispenser 10 rises up from the bottom of the skimmer when the pool chemical is substantially dissolved.

It is also possible to assemble the dispenser 10 of individual materials with specific gravities greater than 1.0, but, when combined with the use of a flotation means with a specific gravity less than 1.0, gives a combined specific gravity of the dispenser that is less than 1.0. In this instance a large foam disk, for example, or other buoyant material, is used to float the dispenser off of the skimmer bottom.

Figure 4:
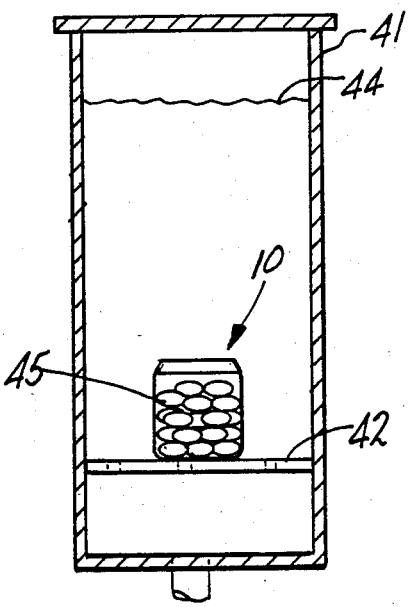
FIG. 4 is a diagrammatic illustration of a container filled with pool chemical tablets immersed in a skimmer.
Figure 5:
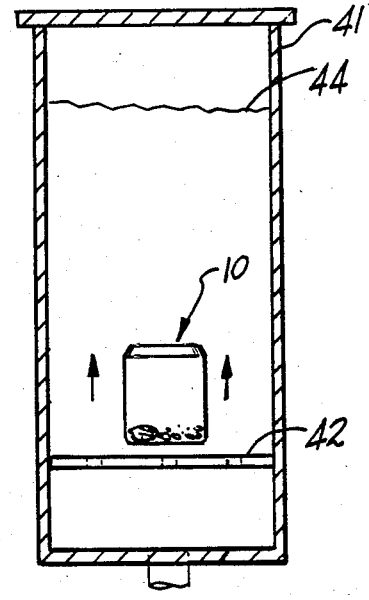
FIG. 5 is a diagrammatic illustration of the dispenser being substantially empty and rising from the bottom of the skimmer with just residue remaining in the container.
Figure 6:
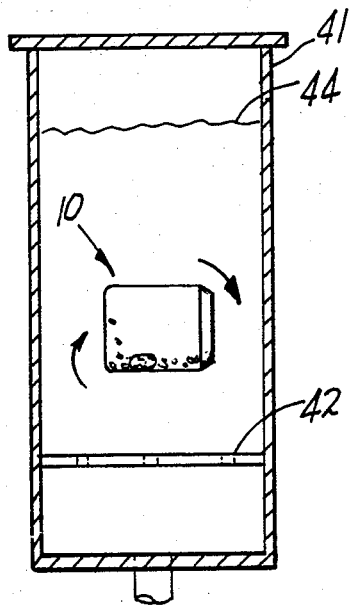
FIG. 6 is a diagrammatic illustration of the inversion step of the dispenser.
Figure 7:
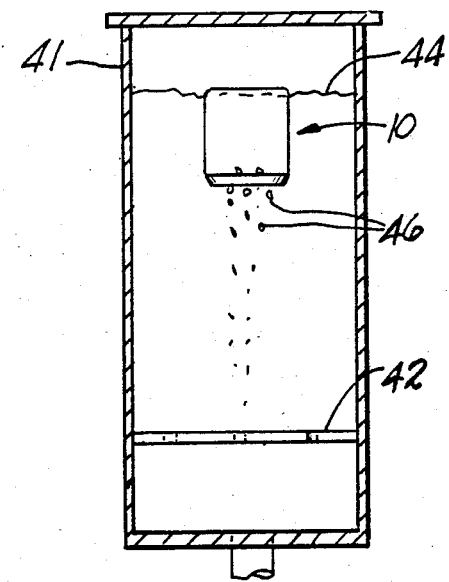
FIG. 7 is a diagrammatic illustration of the dispenser in the inverted position floating at the top of the water surface in the skimmer and the residue being dumped from the dispenser.

The action of the dispenser 10 in a skimmer 41 is best seen in FIGS. 4-7 in diagrammatic fashion. FIG. 4 shows the dispenser 10 filled with a pool chemical that is heavier than water in the form of briquettes 45. The dispenser 10 sits immersed in water on a support shelf 42 well beneath the water surface 44. As the pool chemical briquettes 45 are substantially dissolved, leaving only the residue on the bottom of the dispenser 10, the dispenser begins to float upwardly off the bottom support shelf 42. As seen in FIG. 6, because the dispenser 10 is top heavy from the insertion of the ballast disk 20, the dispenser 10 begins to invert as the dispenser 10 rises toward the top of the water surface. When the dispenser 10 is fully inverted it floats to the top surface of the water level 44 and completes the dumping of the residue particles 46 within the dispenser 10. Floating in the inverted position as seen in FIG. 7, the dispenser 10 is an easily seen signal that the dispenser 10 in the skimmer 41 should be replaced with a dispenser containing new pool chemical.

Figure 8:
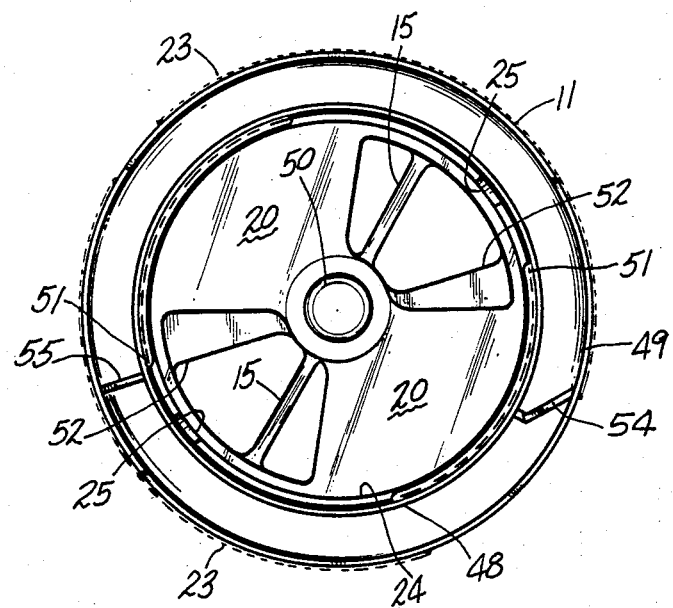
FIG. 8 is a top plan view of the inside of the adjustable top.
Figure 9:
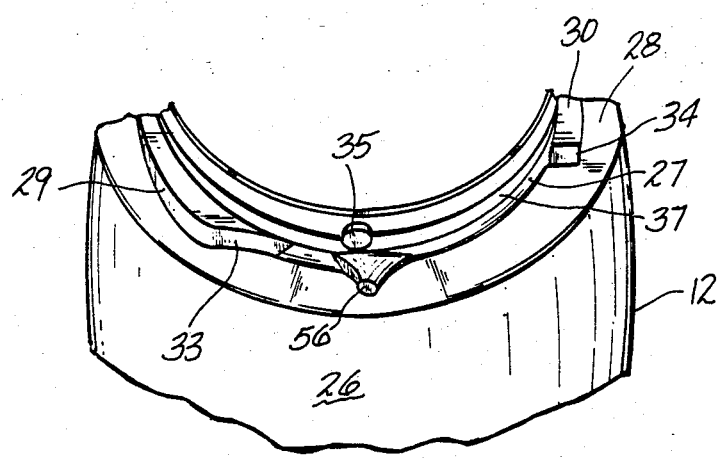
FIG. 9 is a partial perspective view of the pool chemical dispenser showing the deformable stop that is located on the neck of the container.

The interior of adjustable top 11 is seen in FIG. 8. As seen in FIG. 8, adjustable top 11 has an inner lip 48 and an outer lip 49. Ballast disk 20 is seen with its disk lip 24 positioned just interiorly of the inner lip 48. Extending between the spaced-apart inner lip 48 and outer lip 49 are an angled stop detent 54 and a straight detent 55. These detents cooperate with the rotation stop surfaces 31, 32 and 34 in a manner that will be described hereafter. The underside or bottom surface 52 of adjustable top 11 is seen in part in the disk dispensing openings 22. Also seen in FIG. 8 is a recessed circular portion 50 which is the underside of raised circular portion 21 of FIG. 1. The disk locking recesses 25 are also shown.

As seen in FIG. 8, the disk dispensing openings 22 may be covered by the bottom surface 52 of adjustable top 11 to vary the size of the openings through which the pool chemical is dispensed and to thereby selectively control the rate of dissolution of a pool chemical when the dispenser is immersed in water. This setting is controlled by the locking of the disk locking recesses 25 onto and about the circular locking tabs 35 on the container neck 27 of FIG. 1. This secures the ballast disk 20 in a fixed position. The adjustable top 11 may then be grasped by the ridges or serrations 23 and rotated until the desired opening is obtained in the top by the rotational movement of the dispensing openings 14 with respect to the disk dispensing openings 22.

The rotation of the adjustable top 11 is restricted, however, by the angled stop detent 54, the straight detent 55 and the aforementioned surfaces 31 and 32 of top radial rotation stops 29 and 30. When the adjustable top 11 has the dispensing apertures or openings 14 fully closed or covered by the ballast disk 20, the straight detent 55 is flush against the small stop rotation surface 32 and the angled stop detent 54 is adjacent a deformable stop 56, between the rotation stop surface 33 and the deformable stop 56 of FIG. 9.

When it is desired to rotate the adjustable top 11, the angled stop detent 54 is used similar to a blade to crush against the deformable stop 56, permitting the adjustable top 11 to rotate relative to the fixed ballast disk 20. The threshold amount of force necessary to deform stop 56 is more than that which can be applied by a young child so that the adjustable top 11 is child-resistant. When the adjustable top 11 is rotated about the neck 27 until the dispensing openings 14 are directly in line and fully opened or uncovered with respect to the disk dispensing openings 22, the straight detent 55 impacts against the rotation stop surface 31 and the angled stop detent 54 is adjacent the second stop surface 34. The ballast disk 20 is maintained in a fixed position during the rotation by the locking of the circular locking tabs 35 into the disk locking recesses 25 of FIG. 1. Retaining threads 51 of FIG. 8 fit beneath the container locking lips 37 of FIG. 1 on container neck 27 to prevent the adjustable top 11 from being removed and to provide a track for the rotational movement.

In operation the dispenser 10 is filled with a pool chemical, preferable in the form of briquettes 45. The adjustable top is rotated so that angled stop detent 54 deforms the deformable stop 56 upon application of a threshold amount of rotative force to remove the child esistant feature and permit the dispenser to be opened. The disk dispensing openings 22 and the top dispensing openings 14 in the top 11 are aligned to the desired opening. The dispenser 10 is then immersed in water within a skimmer 41 which is connected in a pool flow circuit. The flow circuit typically includes a pump to circulate the water, a skimmer in which a container is placed, a filter to remove any solid residue, and the pool. Water is circulated continuously through this flow circuit. The circulation of water, while the pump is running, causes the water to pass over the top of the dispenser 10 and dissolve the pool chemical. When the pool chemical is substantially dissolved, approximately about 90 to 99% of the pool chemical placed within the container, the dispenser begins to rise or float off the bottom support shelf 42 of the skimmer 41. Because the ballast disk 20 has a specific gravity greater than about 1.0, the dispenser is top heavy and begins to invert. The dispenser 10 continues to rise as it completes the inversion until it floats on top of the water. The fully inverted position permits any residue particles 46 to fall from the dispenser 10 and also to serve as a signal to the maintainer of the pool that is time for a new chemical dispenser.

While the preferred structure in which the principles of the present invention have been incorporated is shown and described above it is to be understood that the invention is not to be limited to the particular details thus presented, but in fact, widely different means may be employed in the practice of the broader aspects of this invention. The scope of the appended claims is intended to encompass all obvious changes in the details, materials and arrangement of parts which will occur to one of skill in the art upon a reading of the disclosure.

What is claimed is:

1. A rotatably adjustable top, a ballast disk insertable into the top, and an open-topped container in a dispenser for dispensing a swimming pool chemical immersed in a body of water, comprising in combination:
   (a) a generally circumferential neck portion on the container having a periphery;
   (b) a deformable stop connected to the neck;
   (c) a first rotation stop connected to the neck and extending about a portion of the periphery, the first rotation stop having a first rotation stop surface;
   (d) a second rotation stop connected to the neck and extending about a portion of the periphery spaced apart from the first rotation stop, the second rotation stop having a first rotation stop surface and a second rotation stop surface;
   (e) a first locking tab and a second generally diametrically opposed locking tab connected to the periphery, each locking tab being intermediate the first rotation stop and the second rotation stop;
   (f) a locking lip fastened to the neck and extending about the periphery;
   (g) a first disk locking recess and a second disk locking recess in the ballast disk cooperative with the first locking tab and the second locking tab to fix the ballast disk in position and prevent rotational movement between the open-topped container and the disk;
   (h) at least one dispensing opening in the top to dispense dissolved pool chemical into the body of water;
   (i) at least one dispensing opening in the ballast disk to dispense dissolved pool chemical into the body of water;
   (j) a generally circumferential inner lip connected to the top surrounding the ballast disk;
   (k) a retaining thread extending at least partially about the inner lip cooperative with the locking lip to permit the adjustable top to rotate about the neck and to prevent the rotatable top from being removed from the neck; and
   (l) a generally circumferential outer lip connected to the top spaced apart from the inner lip defining the exterior of the top having a straight detent and a spaced apart angled detent connected thereto, the straight detent and the angled detent positioned between the inner lip and the outer lip such that upon rotation the angled detent engages the deformable stop and upon application of a threshold amount of rotative force deforms the deformable stop to permit selective rotational movement in a first direction between the top and the ballast disk to uncover the at least one dispensing opening in the ballast disk with the at least one dispensing opening in the top until the straight detent engages the first rotation stop surface of the first rotation stop to thereby permit the dissolved pool chemical to be dispensed at a selectively controlled rate from the dispenser.

2. The apparatus according to claim 1 wherein the straight detent engages the first rotation stop surface of the second rotation stop when rotative force is applied to the top to cause rotational movement of the top in a second direction to cover the at least one dispensing opening in the ballast disk with the at least one dispensing opening in the top.

3. The apparatus according to claim 2 wherein the at least one dispensing opening in the ballast disk and the at least one dispensing opening in the top are cooperative through the rotational movement of the top to selectively vary the size of the at least one opening to thereby vary the rate at which the pool chemical is dispensed.

4. The apparatus according to claim 3 wherein the ballast disk has a raised central portion.

5. The apparatus according to claim 4 wherein the top has a mating section to receive the raised central portion of the ballast disk to assemble the ballast disk and the top.

6. The apparatus according to claim 5 wherein the top has a generally circumferential periphery.

7. The apparatus according to claim 6 wherein the top is serrated about at least a portion of its periphery.

8. The apparatus according to claim 7 wherein the periphery of the top has an opening indicator thereon to indicate the size of the at least one dispensing opening in the top.

* * * * *